United States Patent [19]

Knupp

[11] Patent Number: 5,404,314

[45] Date of Patent: * Apr. 4, 1995

[54] REAL TIME ENVIRONMENTAL LOAD ALLOCATION

[75] Inventor: Stephen L. Knupp, Wilmington, Del.

[73] Assignee: Honeywell Inc., Minneapolis, Minn.

[*] Notice: The portion of the term of this patent subsequent to Jan. 11, 2011 has been disclaimed.

[21] Appl. No.: 125,443

[22] Filed: Sep. 22, 1993

[51] Int. Cl.$^6$ .................. H02J 11/00; G05B 13/02
[52] U.S. Cl. .................... 364/493; 364/156; 364/492; 364/431.01; 307/97; 307/153
[58] Field of Search .............. 364/492, 602, 493, 156, 364/431.01; 307/97, 34, 69, 153

[56] References Cited

U.S. PATENT DOCUMENTS

| | | | |
|---|---|---|---|
| 3,863,270 | 1/1975 | Haley et al. | 364/602 |
| 4,100,428 | 7/1978 | Delisle et al. | 307/34 |
| 4,686,630 | 8/1987 | Marsband et al. | 364/492 |
| 5,278,772 | 1/1994 | Knupp | 364/492 |

Primary Examiner—Emanuel T. Voeltz
Assistant Examiner—Alan Tran
Attorney, Agent, or Firm—Arthur A. Sapelli; William Udseth

[57] ABSTRACT

The method allocates a demanded amount of power to a plurality of power output apparatus, each power output apparatus having an emissions curve associated therewith, such that each of the power output apparatus supplies a portion of the demanded power, and the total power outputted from the plurality of power output apparatus results in a minimum amount of emissions. Data is entered for each of the power output apparatus into a controller. Optimal solutions are generated for all valid possible output power demands using an optimization by parts technique within output power bounds of each of the power output apparatus. The solutions indicate the portion of power each power output apparatus is to supply to provide the total power demanded at minimal emissions output. The solutions are stored in tables within a storage unit of the controller. Upon receipt of a demand for power, a search is performed of the solution tables to obtain the amount of power each power output apparatus is to supply to meet the demand. Control signals are then outputted to each of the power output apparatus, the control signals being indicative of the amount of power to be supplied with the minimum emissions outputted.

9 Claims, 4 Drawing Sheets

| $S_5$ | $S_6$ | $S_{56}$ | $(NOx)_5$ | $(NOx)_6$ | $(NOx)_{56}$ | |
|---|---|---|---|---|---|---|
| 1 | 1 | 2 | 1 | 5 | 6 * | → A |
| 1 | 2 | 3 | 1 | 10 | 11 | B' |
| 2 | 1 | 3 | 3 | 5 | 8 * | → B |
| 1 | 3 | 4 | 1 | 15 | 16 | |
| 2 | 2 | 4 | 3 | 10 | 13 | |
| 3 | 1 | 4 | 6 | 5 | 11 * | → C |
| 1 | 4 | 5 | 1 | 20 | 21 | |
| 2 | 3 | 5 | 3 | 15 | 18 | |
| 3 | 2 | 5 | 6 | 10 | 16 | |
| 4 | 1 | 5 | 10 | 5 | 15 * | → D |
| 1 | 5 | 6 | 1 | 25 | 26 | |
| 2 | 4 | 6 | 3 | 20 | 23 | |
| 3 | 3 | 6 | 6 | 15 | 21 | |
| 4 | 2 | 6 | 10 | 10 | 20 * | → E |
| 5 | 1 | 6 | 16 | 5 | 21 | |
| • | • | 7 | | | | → F |
| • | • | 8 | | | | → G |
| 1 | 8 | 9 | 1 | 40 | 41 | |
| 2 | 7 | 9 | 3 | 35 | 38 | |
| 3 | 6 | 9 | 6 | 30 | 36 | |
| 4 | 5 | 9 | 10 | 25 | 35 * | → H |
| 5 | 4 | 9 | 16 | 20 | 36 | |
| 6 | 3 | 9 | 21 | 15 | 36 | |
| 7 | 2 | 9 | 28 | 10 | 38 | |
| 8 | 1 | 9 | 37 | 5 | 42 | |
| | • | | | | | |
| | • | | | | | |
| | • | | | | | |
| 39 | 50 | 89 | | | NOxz | |
| 40 | 49 | 89 | | | NOyz * | → |
| 40 | 50 | 90 | | | NOzz * | → |

$T_{56}$ (SOLUTION) TABLE

FOR 5/6 COMBINATION

| $S_5$ | $S_6$ | $S_{56}$ | TOTAL $(NOx)_{56}$ |
|---|---|---|---|
| 1 | 1 | 2 | $NO_A$ = 6 |
| 2 | 1 | 3 | $NO_B$ = 8 |
| 3 | 1 | 4 | $NO_C$ = 11 |
| 4 | 1 | 5 | $NO_D$ = 15 |
| 4 | 2 | 6 | $NO_E$ = 20 |
| | | 7 | $NO_F$ |
| | | 8 | $NO_G$ |
| 4 | 5 | 9 | $NO_H$ = 35 |
| | | 10 | |
| | | 11 | |
| | | • | • |
| | | • | • |
| | | • | • |
| 40 | 49 | 89 | |
| 40 | 50 | 90 | |

REAL TIME ENVIRONMENTAL LOAD ALLOCATION

RELATED APPLICATION

The present application is related to patent application, Ser. No. 07/879,645, entitled "Real Time Economic Load Allocation", by S. L. Knupp, filed May 06, 1992, and to patent application, Ser. No. 08/125,625, entitled "Real Time Load Allocation with Additional Constraints", by S. L. Knupp, filed on even date herewith, and to patent application, Ser. No. 08/125,450, entitled "Real Time Resource Allocation", by S. L. Knupp, filed on even date herewith, all of the above assigned to Honeywell Inc., the assignee of the present application.

BACKGROUND OF THE INVENTION

The present invention relates to a method of control, and more particularly, to a method of real time control of a plurality of power output apparatus for providing a demanded quantity of desired output power which generally results in the generation of some undesired output, the undesired output of the combined power output apparatus being kept at or below a predetermined level.

Recent federal (and some state) legislation which emphasizes the reduction of emissions into the atmosphere/ environment is a major concern in the generation of power. Emissions (the undesired output portion of the power output apparatus) are to be kept at or under predetermined levels which meet the legislative requirements, or the non-complier can be subjected to heavy penalties. As a result of these environmental constraints, there is a need to provide a method for generating the demanded output power which meet the required emissions levels.

Some approaches toward solving the emissions problem include utilizing less pollutant fuels, purchasing extra emissions allowances (as permitted by the current legislation), installing emissions reducing apparatus in the power generation system (or in the smoke stack or exhaust pipe), simulating the power generating system and power system operation and forecasting therefrom, . . . .

The present invention provides a method for selecting a portion of the demanded power output from each of the power output apparatus such that the total from all the power output apparatus meets the demanded power output, and the total emissions from all of the power output apparatus is minimized or at least meets the required levels.

SUMMARY OF THE INVENTION

Therefore, there is provided by the present invention, a method of real time environmental load allocation. The method of the present invention allocates a demanded amount of power to a plurality of power output apparatus, each power output apparatus having an emissions curve associated therewith, such that each of the power output apparatus supplies a portion of the demanded power, and the total power outputted from the plurality of power output apparatus results in a minimum amount of emissions. Data is entered for each of the power output apparatus into a controller. Optimal solutions are generated for all valid possible output power bounds of each of the power output apparatus. The solutions indicate the portion of power each power output apparatus is to supply to provide the total power demanded at minimal emissions output. The solutions are stored in tables within a storage unit of the controller. Upon receipt of a demand for power, a search is performed of the solution tables to obtain the amount of power each power output apparatus is to supply to meet the demand. Control signals are then outputted to each of the power output apparatus, the control signals being indicative of the amount of power to be supplied with the minimum emissions outputted.

Accordingly, it is an object of the present invention to provide a method for making a real time environmental load allocation of power output apparatus.

It is another object of the present invention to provide a method for allocating a portion of the demanded power output from each of the power output apparatus such that the total combined power output from each of the power output apparatus meets the demanded power output, and the total emissions from each of the power output apparatus is minimized and/or meets the required emissions levels.

These and other objects of the present invention will become more apparent when taken in conjunction with the following description and attached drawings, wherein like characters indicate like parts, and which drawings form a part of the present application.

BRIEF DESCRIPTION OF THE DRAWINGS

FIG. 3, which comprises FIG. 4 shows an example of the generation of the boiler 5/6 optimal emissions combination solution table, which is depicted in the optimal emissions curve of FIG. 3C.

DETAILED DESCRIPTION

Figure 1:
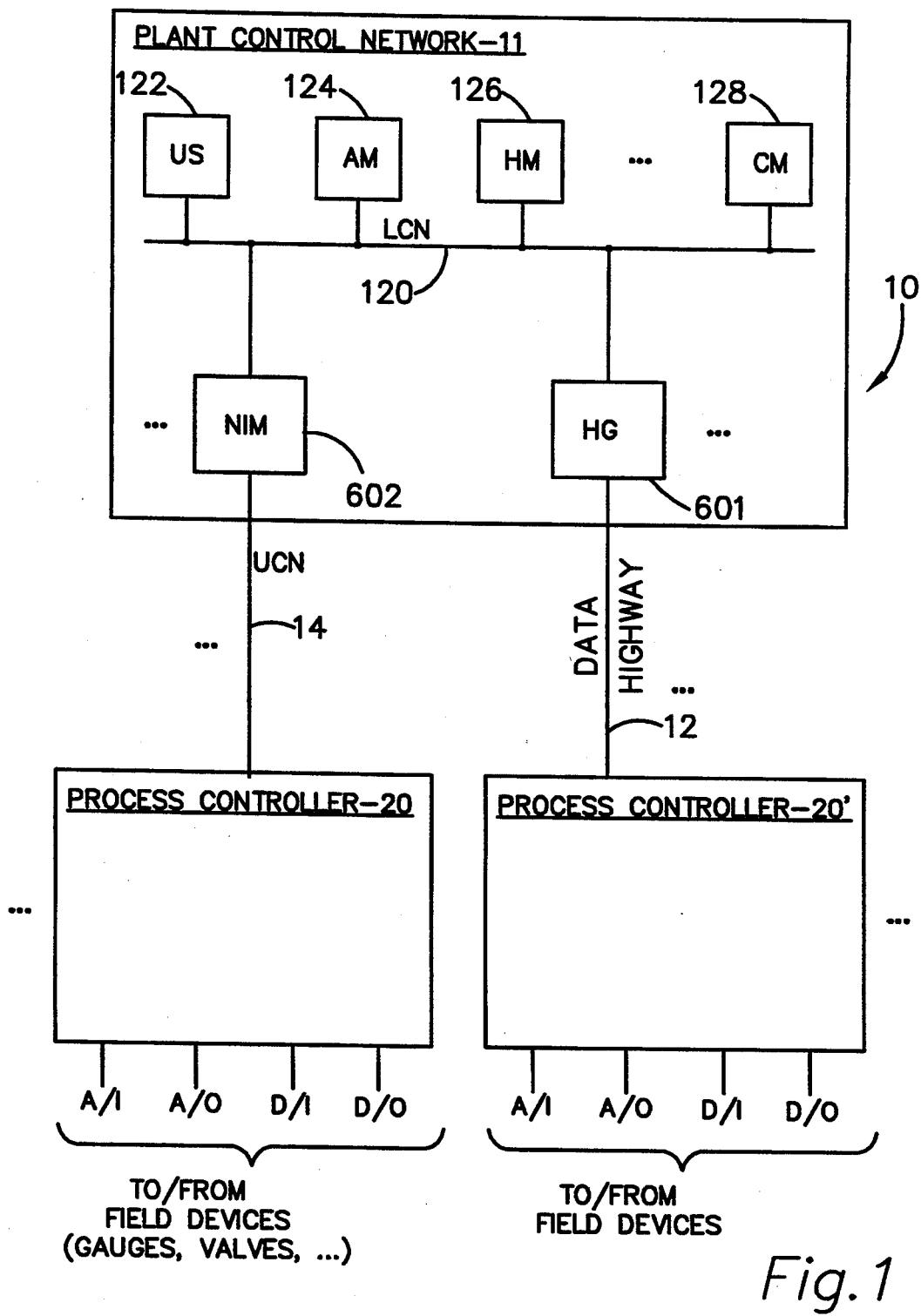
FIG. 1 shows a block diagram of the preferred embodiment of the process control system in which the present invention is utilized.

Before describing the method of the present invention, it will be helpful in understanding a process control system, and in particular, the process control system of the preferred embodiment in which the method of the present invention can be utilized. Referring to FIG. 1, there is shown a block diagram of a process control system 10. The process control system 10 includes a plant control network 11, and connected thereto is a data highway 12, which permits a process controller 20' to be connected thereto. In the present day process control system 10, additional process controller 20' can be operatively connected to the plant control network 11 via a corresponding highway gateway 601 and a corresponding data highway 12. A process controller 20, is operatively connected to the plant control network 11 via a universal control network (UCN) 14 to a network interface module (NIM) 602. In the preferred embodiment of the process control system 10, additional process controllers 20 can be operatively connected to the plant control network 11 via a corresponding UCN 14 and a corresponding NIM 602. The process controllers 20, 20' interface the analog input and output signals, and digital input and output signals (A/I, A/O, D/I, and D/O, respectively) to the process control system 10 from the variety of field devices (not shown) which include valves, pressure switches, pressure gauges, thermocouples, . . . .

The plant control network 11 provides the overall supervision of the controlled process, in conjunction with the plant operator, and obtains all the information needed to perform the supervisory function, and includes an interface with the operator. The plant control network 11 includes a plurality of physical modules, which include a universal operator station (US) 122, an application module (AM) 124, a history module (HM) 126, a computer module (CM) 128, and duplicates of these modules (and additional types of modules, not shown) as necessary to perform the required control/-supervisory function of the process being controlled. Each of these physical modules includes a microprocessor and is operatively connected to a local control network (LCN) 120 which permits each of these modules to communicate with each other as necessary in accordance with a predetermined protocol. The NIM 602 and HG 601 provide an interface between the LCN 120 and the UCN 14, and the LCN 120 and the data highway 12, respectively. A more complete description of the plant control network 11, and the physical modules can be had by reference to U.S. Pat. No. 4,607,256, and a more complete description of the process controller 20' can be had by reference to U.S. Pat. No. 4,296,464. The process controller 20, provides similar functions to that of process controller 20' but contains many improvements and enhancements.

In the preferred embodiment of the present invention, it is desired to control a plurality of boilers (not shown) which outputs power (steam) for the process being controlled, and more specifically, it is desired to allocate the amount of steam each boiler is to supply such that the total emissions from all the boilers is minimized. The function of allocating (i.e., the real time load allocator) of the preferred embodiment of the present invention is performed by the application module (AM) 124, although it will be understood by those skilled in the art that the function can be performed by other modules of the process control system 10, including the process controller 20.

The method of the present invention will now be described. For purposes of example, the process includes six (6) boilers which are to be included in supplying steam to the process. All boilers have different emissions curves due to the variety of fuels available, different operating efficiency curves, . . . . Each boiler has associated therewith a curve of steam vs. emissions, and in particular, a curve for each type of emission, e.g., Nitrogen Oxides ($NO_x$) vs. steam, Sulphur Oxides ($SO_x$) vs. steam, carbon monoxide (CO) vs. steam, . . . .

Figure 2:
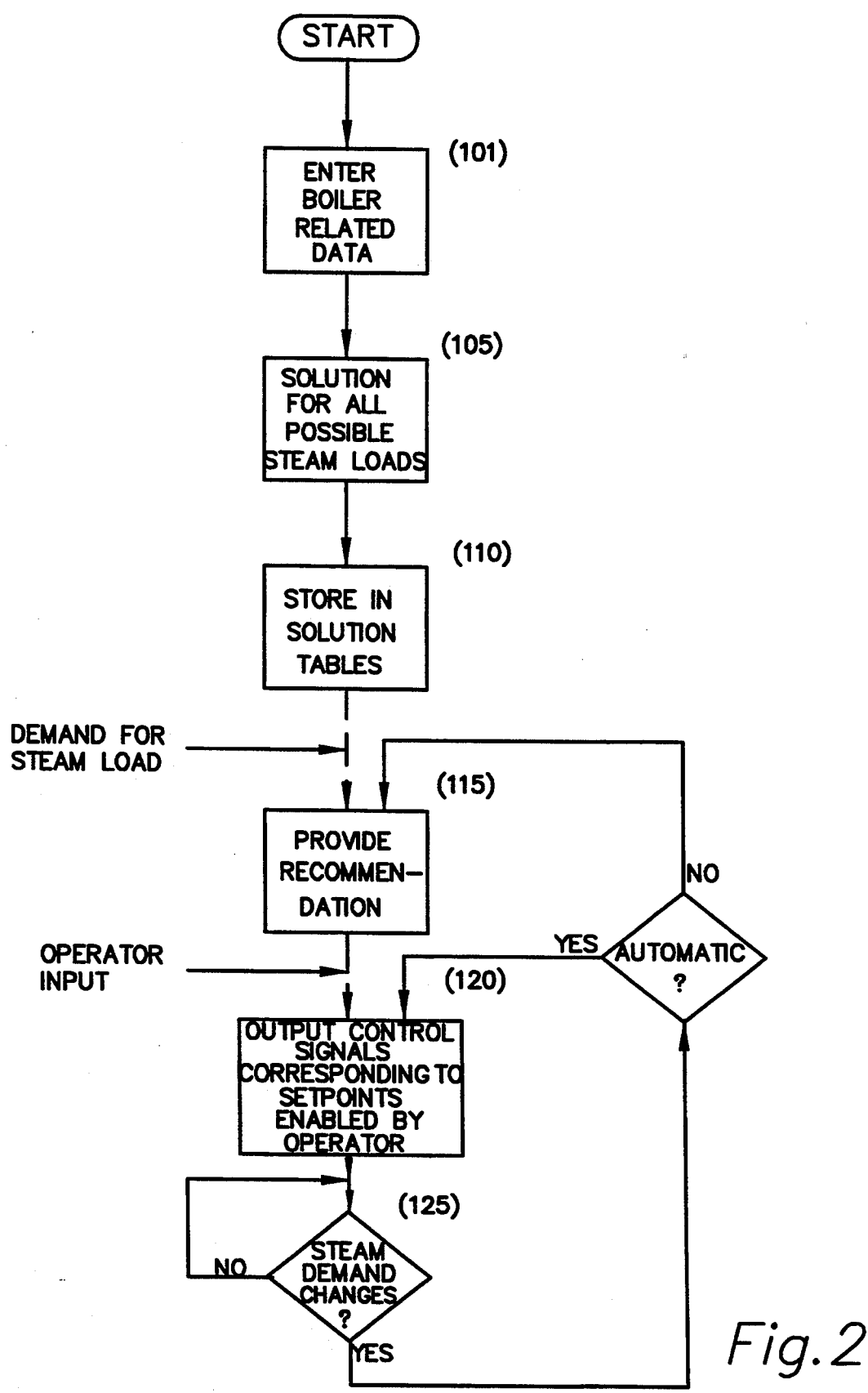
FIG. 2 shows a flow diagram outlining the setup and overall implementation of the method of the present invention.

Referring to FIG. 2, there is shown a flow diagram outlining the setup and overall implementation of the method of the present invention. In the preferred embodiment of the present invention, a user enters the fuel cost, boiler range, emissions data, and efficiency parameters into the application module 124 as numeric points (block 101). This information essentially makes up the data (or cost, emissions, . . . ) curves, sometimes referred to as characterization data, referred to above. After the parameters are entered the present invention performs a setup procedure and solves for all possible solutions of interest, in this example, $NO_x$ emissions are to be minimized versus steam output, and for the special cases such as offline boilers (block 105). These solutions are stored in solution tables which are used to provide instant recommendations for any steam load demands (block 110). If any of the critical parameters such as the operating efficiency curves, emissions curves, or fuel costs are changed, a new setup is performed and new tables created. Typically the setup procedure is completed within one minute of processing time in the preferred embodiment of the present invention. The application module, i.e., the process control system 10, is ready for the process control function. Upon receiving a demand for a steam load, the present invention searches the solution tables and provides instantaneous recommendations to load each boiler for the current steam demand (block 115) and which results in the minimum amount of undesired output, in this example the $NO_x$ emissions. When the operator input is received enabling the optimal loading solutions (or indicating other loading desired) the information is outputted directly by the process control system or ramped over a period of time in response to the operator command. The output of the present invention interfaces directly into traditional controller schemes so that bias loads necessary are provided to minimize boiler emissions or directly provide each boiler steam demand set point as is well known by those skilled in the art (block 120). As steam demands change (block 125) new control signals are outputted or if the system is in a nonautomatic mode the recommendations are provided (block 115) and an operator input awaited.

Although not shown, as the steam demand changes, the method of the present invention can provide current solutions on a real-time basis to provide the optimal load distribution for the current set of boilers, or a second "global solution" is provided which considers boilers that are to be taken off line, or placed on line. The method of the present invention determines the effects of shutting down boilers during periods of minimum demand while maintaining the required excess capacity to meet changes in the steam demand. This provides a tremendous cost savings during partial plant shutdowns. In addition the method of the present invention can determine the optimum steam load for maintenance for plant shutdowns. When a boiler is shutdown, a partial setup procedure is executed and the solution tables modified to reflect a loss of the boiler and the effects of losing an additional boiler. When the steam demand increases above the excess capacity set point, the method of the present invention will automatically recommend that the offline boiler be restarted to meet the new demand. The setup procedure is then executed and a new set of solution tables is calculated. The local optimization/minimization is calculated, i.e., solutions where the same number of boilers is maintained. The global solution examines all possible distributions of the steam rate across all available boilers (except those designated as being offline for maintenance) and determines the best set of boilers to use for steam production.

The method of the present invention high speed optimization/minimization technique utilizes a Method of Optimization by Parts which guarantees that the optimal dependent variable parameter (emissions) loading is always determined. Since the performance curve representing boilers are not limited to straight lines (as in the case with some types of optimization, the results of the present invention are extremely accurate). The performance curves (sometimes referred to as characterization curves) can be of any type of algebraic equation including high order polynomials.

The determination of optimal loading of the boilers to meet a predetermined total steam load resulting in a minimum $NO_x$ emissions output, for example, of the method of the present invention will now be described. It is desired in the example to minimize the nitrous oxide emissions ($NO_x$) such that the total emissions of nitrous oxide, TN, from all the boilers, n, is minimized subject to the total steam demand (TS), where the total steam is the sum of the steam outputted from all the boilers n.

$$min TN = \Sigma(NO_x)_n$$

subject to $$TS = \Sigma S_n$$

For purposes of example only, a system having six (6) boiler will be discussed. As mentioned above, each boiler has its own characteristics resulting in a unique emissions curve, or more specifically, $NO_x$ emissions versus steam curve. The method of the present invention combines the $NO_x$ emissions curves of each of the boilers to obtain an optimal emissions curve for the combination of all the boilers. The method uses an optimization by parts technique which combines two (2) boilers in this example, then combines that combination with another boiler, then combines that combination with yet another combination . . . . The total boilers can be expressed as a function of the total steam or f(T) where $$f(T) = G(X1, X2, X3, X4, X5, X6) = G_1(X1) + G_2(X2) + G_3(X3) + G_4(X4) + G_5(X5) + G_6(X6)$$

where T = total steam,
Xn = steam for the boiler n, and $$N_1 \leq X1 \leq M_1$$

$$N_2 \leq X2 \leq M_2$$

$$N_3 \leq X3 \leq M_3$$

$$N_4 \leq X4 \leq M_4$$

$$N_5 \leq X5 \leq M_5$$

$$N_6 \leq X6 \leq M_6$$

$N_1, \ldots N_6$ are known, $M_1 \ldots M_6$ are known, and T (the total steam) equals $X1 + X2 + X3 + X4 + X5 + X6$. In addition, $$T_{min} = N_1 + N_2 + N_3 + N_4 + N_5 + N_6$$

$$T_{max} = M_1 + M_2 + M_3 + M_4 + M_5 + M_6.$$

The functions $G_1 \ldots G_6$ are of any algebraic order or form. Typically boilers are expressed as $$G_n(X_n) = A_n X^3_n - B_n X^2_n + C_n X_n - D_n$$

$T_{min}$ (the minimum total steam)

$T_{min}$ (the maximum total steam)

The optimization used in the Method of Optimization by Parts optimizes the f(T) in accordance with the expression $$OPT[f(T)] = OPT[G_1(X1) + OPT[G_2(X2) + OPT[G_3(X3) + OPT[G_4(X4) + OPT[G_5(X5) + G_6(X6)]]]]]$$

OPT = optimize

The technique (or algorithm) of the present invention defines a new variable $$S_{56} = X_5 + X_6$$

$$S_{56m} M_5 + M_6 \text{ and}$$

$$S_{56n} = N_5 + N_6.$$

It is now desired to combine or optimize the boilers 5 and 6 in accordance with the following expression. All combinations are iterated for $S_{56}$ from $S_{56n}$ to $S_{56m}$ to obtain a new function $f_{56}(S_{56})$. That results in an optimal emissions curve for the combination of 56. Next, $G_4(X_4)$ is optimized with the 56 combination $$S_{456} = X_4 + S_{56}$$

$$S_{456m} = M_4 + M_{56m}$$

$$S_{456n} = N_4 + S_{56n}$$

Figure 3A:
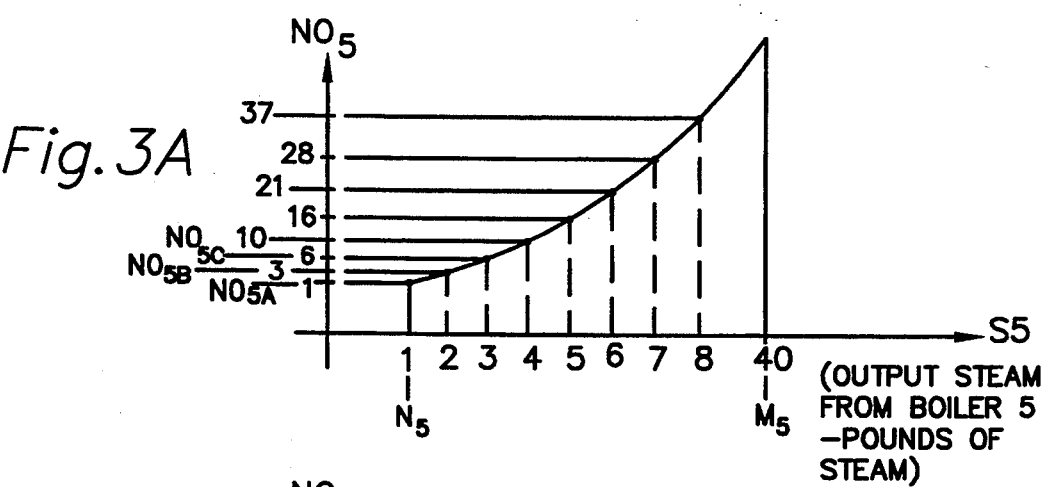
FIGS. 3A-3C, shows emissions examples of emissions curves for boilers 5 and 6 of an example, and an optimal emissions curve for the combination.
Figure 3B:
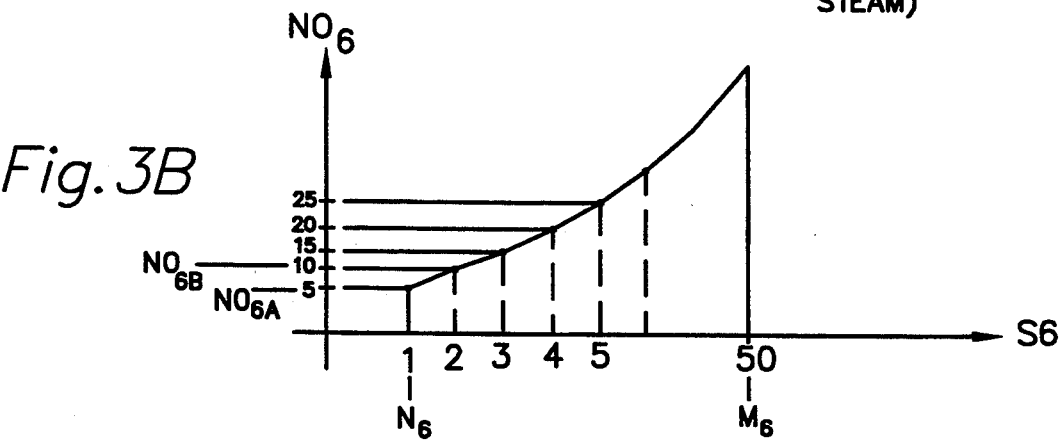
Figure 3C:
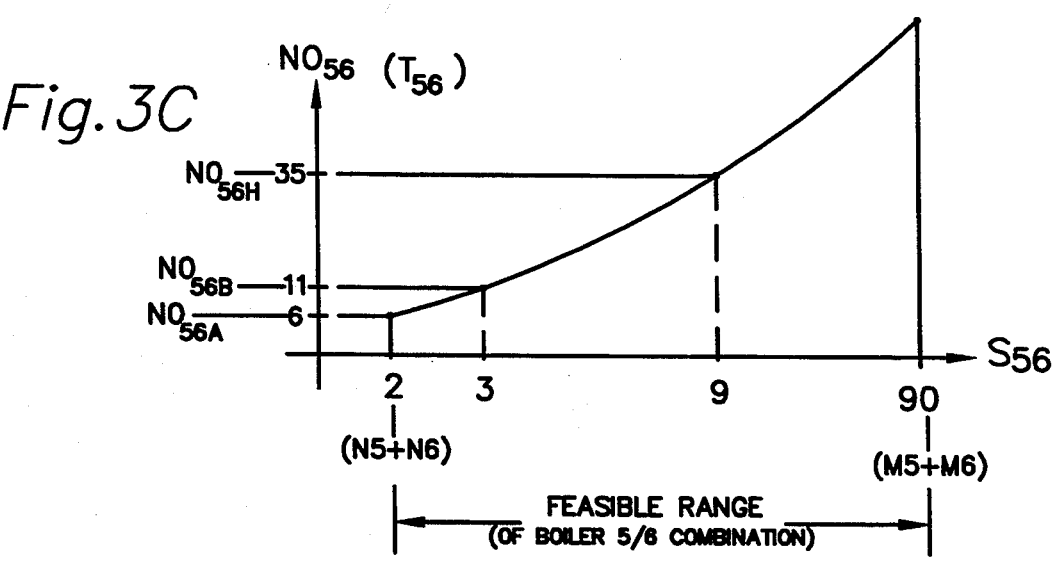

This results in combining boiler 4 with the combination of the 56 boilers to obtain a new optimal emissions curve. This continues until all the boilers have been combined as follows $$f_{456}(S_{456}) = OPT[G_4(X_4) + F_{56}(S_{56})];$$

$$f_{3456}(S_{3456}) = OPT[G_3(X_3) + f_{456}(S_{456})];$$

$$f_{23456}(S_{23456}) = OPT[G_2(X_2) + f_{3456}(S_{3456})]; \text{ and}$$

$$f_{123456}(S_{123456}) = OPT[G_1(X_1) + f_{23456}(S_{23456})];$$

and results in five (5) solution tables which are
$T_{123456}$
$T_{23456}$
$T_{3456}$
$T_{456}$
$T_{56}$ Referring to FIG. 3 which comprises FIGS. 3A, 3B, and 3C, there is shown an emissions curve for boiler 5, an emissions curve for boiler 6, and an emissions curve for the combination of boilers 56 in accordance with the algorithm described above. The abscissa of the curve is the output steam from boiler 5 ($S_5$) in pounds of steam. The ordinate axis is the emissions value of the respective boiler. Boiler 5 in this example can output no lower than one (1) lb of steam and no more than 40 lbs of steam, $N_5$ and $M_5$, respectively. A emissions output of operating the boiler 5 having an output of 1 lb of steam is $NO_{5A}$ (= 1). Similarly, for outputting 2 lbs of steam the emissions output of operating boiler 5 is $NO_{5B}$ (= 3), . . . . FIG. 3B shows the emissions output with respect to the output steam production from boiler 6. In this example boiler 6 can output no less than 1 lb of steam and no more than 50 lbs of steam ($N_6$ and $M_6$, respectively). When boiler 6 operates to output 1 lb of steam the emissions output associated with operating boiler 6 is $NO_{6A}$. The optimization by parts method combines the emissions curve of boiler 5 and boiler 6 to arrive at an optimally combined emissions curve $T_{56}$ shown in FIG. 3C.

The curve is derived by a combination shown in FIG. 4. Referring to FIG. 4, the (points of the) combination curve is shown. The minimum that the combination can output is 2 lbs of steam, thus, the column $S_{56}$ outputs 2 lbs of steam, and the only combination available is $S_5$ outputting 1 lb of steam and boiler 6 outputting 1 lb of steam. The emissions associated with the respective boilers are added to derive a total emissions, i.e., $NO_{5A} + NO_{6A} = NO_{56A}$. That results in a single point on the $T_{56}$ emissions curve and is shown in the $T_{56}$ table, or solution table $T_{56}$. To output 3 lbs of steam from the combination, boiler 5 can output 2 lbs of steam in which case boiler 6 outputs 1 lb of steam or boiler 6 outputs 2 lbs of steam and boiler 5 outputs 1 lb of steam. No other combination is realizable given the minimum output of both boilers and the desired output, that is 3 lbs of steam. The emissions associated with boiler 5 running at 2 lbs of steam is $NO_{5B}$ and the emissions associated with running boiler 6 at 1 lb of steam is $NO_{6A}$, the sum being the total emissions which is $NO_{56B}$. The other alternative is when boiler 5 is outputting 1 lb of steam and boiler 6 is outputting 2 lbs resulting in the desired output total of 3 lbs of steam. The emissions associated with running boiler 5 with this specified output is $NO_{5A}$ and the emissions associated with operating boiler 6 at 2 lbs of steam is $NO_{6B}$, resulting in a total emissions of $NO_{56B'}$. The total emissions for 3 lbs output of steam are examined, i.e., $NO_{56B}$ is compared with $NO_{56B'}$ and the lowest value selected. In this example the total emissions marked with an asterisk are the lowest emissions (given the numbers of the example) and thus form the next point in the $T_{56}$ table. Thus the second data line of the $T_{56}$ table contains the point $S_{56}$ at 3 lbs of total steam output from the boiler 5 and 6 combination and the total emissions being $NO_{56B}$. The individual values of steam between $S_5$ and $S_6$ are also kept in the $T_{56}$ table. The process continues for the next point or 4 lbs of output from the combination and in this case $NO_{56C}$ is the lowest emissions of the three and thus this particular point of information is stored in the $T_{56}$ table and continues until the total combinations are performed. The total output from the combinations can only be 90 lbs, i.e., $M_5$ and $M_6$, or $40+50=90$. Once all the points are determined the $T_{56}$ emissions curve is completed. Then the $T_{56}$ emissions curve is combined with the emissions curve for boiler 4 resulting in the $T_{456}$ emissions curve or $T_{456}$ solution table. This combination is then combined with boiler 3, . . . until finally a total combination of boilers 1–6 is performed, resulting in five solution tables $T_{123456}$, $T_{23456}$, $T_{3456}$, $T_{456}$, and $T_{56}$. Once the total steam demand is known a fast table lookup is performed and the outputs of each individual boilers are determined from the solution tables and outputted (to the operator for a recommendation or automatically to the boilers, as discussed above).

In an alternative approach the optimal emissions curve (or solution table for boilers 2 and 3 can be generated and an optimal solution, optimal emissions curve for boilers 5 and 6 can be generated. Then the boiler 23 combination can be combined with boiler 1 and the boiler 56 combination can be combined with boiler 4 resulting in an $T_{123}$ table and an $T_{456}$ table, respectively. Finally the $T_{123}$ table and the $T_{456}$ table can be combined which results in a total solution of $T_{123456}$ solution table. This approach takes up less memory but requires slightly more processing time. The global tables referred to above would include various combinations eliminating first boiler 1, then boiler 2 . . . . The number of iterations for the method of the present invention as compared with classical methods which require solution of arrays is in the order of 1: 10,000,000 times faster.

Although the example above shows optimizing $NO_x$ as a function of steam, it will be understood by those skilled in the art that $SO_x$ can be optimized as a function of steam, CO can be optimized as a function of steam, electrical power can be optimized as a function of steam, cost can be optimized as a function of steam, . . . . The parameter being optimized is the dependent variable, and the constraint is the independent variable. The constraint can be pounds of steam (or steam load), cost, . . . . It should be noted, that optimized as used herein is used interchangeably with minimized and it's meaning being derived from the context, e.g., maximizing efficiency or minimizing emissions is oftentimes stated as optimizing efficiency or optimizing emissions.

While there has been shown what is considered the preferred embodiment of the present invention, it will be manifest that many changes and modifications can be made therein without departing from the essential spirit and scope of the invention. It is intended, therefore, in the annexed claims to cover all such changes and modifications which fall within the true scope of the invention.

I claim:

1. A method for allocating a demanded amount of power to a plurality of power output apparatus, each power output apparatus having an emissions curve associated therewith, such that each of the power output apparatus supplies a portion of the demanded power wherein a total of the power outputted from the plurality of power output apparatus equals the amount of the demanded power, and such that the total power outputted from the plurality of power output apparatus results in a minimum amount of emissions, the method comprising the steps of:

a) entering data for each of the power output apparatus into a controller, the data including emissions output as a function of power output about each of the power output apparatus;

b) generating optimum solutions by parts for all possible valid output power demands, within output power bounds of each of the power output apparatus, the solutions indicating the portion of power each power output apparatus is to supply to provide the total power demanded at minimal emissions output;

c) storing the solutions in tables within a storage unit of the controller;

d) upon receipt of a demand for power, performing a search of the solution tables to obtain the amount of power each power output apparatus is to supply, the total of the amounts of power from each power output apparatus being equal to the amount of power demanded at minimal emissions output; and e) outputting control signals to each of the power output apparatus, the control signals being indicative of the amount of power to be supplied.

2. A method for allocating a demanded amount of power according to claim 1, wherein the number of power output apparatus is N, the step of generating solution by optimization by parts comprises the steps of:

a) combining characterization data of a first power output apparatus to characterization data of a second power output apparatus to yield an optimal characterization of the first and second power output apparatus combination;

b) if N is greater than 2, combining characterization data of a next power output apparatus to the optimal characterization of the combination of the previous combining operation, otherwise proceeding to step (d);

c) repeating step (b) until all N power output apparatus have been optimally combined, thereby yielding an optimally combined combination of all N power output apparatus;

d) exiting the step of generating.

3. A method of allocating a demanded amount of power according to claim 2, further comprising the steps of:

combining all combinations of N power output apparatus
omitting predetermined ones of the power output apparatus, thereby yielding a global allocation.

4. A method for allocating a demanded amount of power according to claim 3, wherein the controller is a process control system.

5. A method for allocating a demanded amount of power according to claim 4, wherein the control signals are set points.

6. A method for allocating a demanded amount of power according to claim 3, wherein the step of performing a search comprises the steps of:

a) upon receipt of a demand for power, performing a search of the solution tables to obtain the amount of power each power output apparatus is to supply, the total of the amounts of power from each power output apparatus being equal to the amount of power demanded at minimal emissions output;

b) outputting the recommended solutions obtained from the solution tables;

c) waiting for an operator input to proceed; and d) if the operator input to proceed is not inputted, waiting for an operator input to supply manually selected allocations thereby overriding the recommended solutions.

7. A method for allocating a demanded amount of power according to claim 6, further comprising the steps of:

a) monitoring the demanded amount of power; and b) if the amount of power demanded is changed, proceeding to step (a) of claim 6, otherwise proceeding to step (a).

8. A method for allocating a demanded amount of power according to claim 2, wherein the steps of combining are performed x-at-a-time, where x is equal to or greater than two (2).

9. A method for allocating a demanded amount of power according to claim 3, wherein the steps of combining are performed x-at-a-time, where x is equal to or greater than two (2).

* * * * *